(12) United States Patent
Kerner et al.

(10) Patent No.: US 7,805,630 B2
(45) Date of Patent: Sep. 28, 2010

(54) DETECTION AND MITIGATION OF DISK FAILURES

(75) Inventors: Matthew Kerner, Seattle, WA (US); Swetha Narayanaswamy, Bangalore (IN); Barbara Kess, Sammamish, WA (US); Yi Meng, Bellevue, WA (US); Weijuan Shi, Issaquah, WA (US); Michael Ryan Berg, Seattle, WA (US); Randall K. Winjum, Vashon, WA (US)

(73) Assignee: Microsoft Corporation, Redmond, WA (US)

( * ) Notice: Subject to any disclaimer, the term of this patent is extended or adjusted under 35 U.S.C. 154(b) by 588 days.

(21) Appl. No.: 11/494,659

(22) Filed: Jul. 27, 2006

(65) Prior Publication Data
US 2008/0028264 A1    Jan. 31, 2008

(51) Int. Cl.
*G06F 11/00* (2006.01)

(52) U.S. Cl. .................................. 714/5; 714/42; 714/47

(58) Field of Classification Search .................. 714/5, 714/42, 47, 57
See application file for complete search history.

(56) References Cited

U.S. PATENT DOCUMENTS

| | | | | |
|---|---|---|---|---|
| 5,504,863 A * | 4/1996 | Yoshida | | 714/47 |
| 5,809,527 A * | 9/1998 | Cooper et al. | | 711/133 |
| 5,832,199 A * | 11/1998 | Apperley et al. | | 714/6 |
| 5,961,651 A * | 10/1999 | Gittins et al. | | 714/5 |
| 6,058,494 A * | 5/2000 | Gold et al. | | 714/42 |
| 6,249,838 B1 * | 6/2001 | Kon | | 711/103 |
| 6,425,006 B1 * | 7/2002 | Chari et al. | | 709/224 |
| 6,460,151 B1 | 10/2002 | Warwick et al. | | |
| 6,493,656 B1 * | 12/2002 | Houston et al. | | 702/187 |
| 6,574,754 B1 * | 6/2003 | Smith | | 714/47 |
| 6,600,614 B2 * | 7/2003 | Lenny et al. | | 360/31 |
| 6,708,297 B1 * | 3/2004 | Bassel | | 714/47 |
| 6,751,758 B1 * | 6/2004 | Alipui et al. | | 714/54 |
| 6,845,474 B2 * | 1/2005 | Circenis et al. | | 714/48 |
| 6,883,120 B1 * | 4/2005 | Banga | | 714/47 |
| 7,146,387 B1 * | 12/2006 | Russo et al. | | 707/204 |
| 7,191,367 B2 * | 3/2007 | Ito et al. | | 714/47 |
| 7,216,264 B1 * | 5/2007 | Glade et al. | | 714/48 |
| 7,222,267 B2 * | 5/2007 | Jeong | | 714/42 |
| 7,243,188 B2 * | 7/2007 | Black | | 711/111 |
| 7,281,172 B2 * | 10/2007 | Chujo | | 714/48 |
| 7,293,203 B1 * | 11/2007 | Coatney et al. | | 714/42 |
| 7,310,742 B2 * | 12/2007 | Zimmer et al. | | 714/5 |
| 7,359,186 B2 * | 4/2008 | Honda et al. | | 361/685 |

(Continued)

OTHER PUBLICATIONS

"Smart_Send_Drive_Command," Microsoft Corporation, Feb. 18, 2005, http://msdn.microsoft.com/library/en-us/storage/hh/storage/k307_2b043284-934c-4440-a4a4-6078f1bc845d.xml.asp?frame=true.

(Continued)

*Primary Examiner*—Robert Beausoliel
*Assistant Examiner*—Joshua P Lottich
(74) *Attorney, Agent, or Firm*—Marshall, Gerstein & Borun LLP

(57) ABSTRACT

A method and apparatus to detect and mitigate disk failure is disclosed. The method may collect data from a disk from time to time and by analyzing the data, may provide an alert that there is a bad disk.

15 Claims, 5 Drawing Sheets

U.S. PATENT DOCUMENTS

| | | | |
|---|---|---|---|
| 7,360,121 B2 * | 4/2008 | Srivastava et al. | 714/47 |
| 7,360,122 B2 * | 4/2008 | Srivastava et al. | 714/47 |
| 7,370,241 B2 * | 5/2008 | Nicholson et al. | 714/47 |
| 7,395,460 B2 * | 7/2008 | El-Batal | 714/57 |
| 7,409,575 B2 * | 8/2008 | Komarla et al. | 714/2 |
| 7,409,605 B2 * | 8/2008 | Kato et al. | 714/57 |
| 7,451,286 B2 * | 11/2008 | Nadathur et al. | 711/162 |
| 7,469,363 B2 * | 12/2008 | Meis et al. | 714/47 |
| 7,685,358 B1 * | 3/2010 | Larson et al. | 711/111 |
| 7,685,463 B1 * | 3/2010 | Linnell | 714/7 |
| 2003/0005362 A1 * | 1/2003 | Miller et al. | 714/27 |
| 2003/0070112 A1 * | 4/2003 | York | 714/5 |
| 2004/0205380 A1 * | 10/2004 | Black | 714/5 |
| 2004/0210800 A1 * | 10/2004 | Vecoven et al. | 714/47 |
| 2005/0010609 A1 * | 1/2005 | Katoh et al. | 707/200 |
| 2005/0120273 A1 * | 6/2005 | Hudson et al. | 714/38 |
| 2006/0005070 A1 * | 1/2006 | Zimmer et al. | 714/5 |
| 2006/0087945 A1 * | 4/2006 | Hwang et al. | 369/53.17 |
| 2006/0184820 A1 * | 8/2006 | Kato et al. | 714/5 |
| 2006/0265172 A1 * | 11/2006 | Basham et al. | 702/117 |
| 2006/0282709 A1 * | 12/2006 | Shu et al. | 714/100 |
| 2007/0026794 A1 * | 2/2007 | Ayyagari et al. | 455/11.1 |
| 2007/0050664 A1 * | 3/2007 | Tan et al. | 714/5 |
| 2007/0150651 A1 * | 6/2007 | Nemiroff et al. | 711/114 |
| 2007/0174719 A1 * | 7/2007 | Inoue et al. | 714/42 |
| 2007/0179997 A1 * | 8/2007 | Nooning, III | 707/204 |
| 2007/0220308 A1 * | 9/2007 | Yeung et al. | 714/5 |
| 2007/0294575 A1 * | 12/2007 | Aichelen et al. | 714/13 |
| 2007/0294588 A1 * | 12/2007 | Coulson | 714/42 |
| 2008/0010559 A1 * | 1/2008 | Kondajeri et al. | 714/47 |
| 2008/0022058 A1 * | 1/2008 | Nadathur et al. | 711/162 |
| 2008/0177971 A1 * | 7/2008 | Prahlad et al. | 711/170 |
| 2008/0256397 A1 * | 10/2008 | Smith | 714/47 |
| 2009/0106605 A1 * | 4/2009 | Kuchibhotla et al. | 714/47 |

OTHER PUBLICATIONS

"Smart_RCV_Drive-Data," Microsoft Corporation, Feb. 18, 2005, http://msdn.microsoft.com/library/en-us/storage/hh/storage/k307_8c974d08-3752-4442-82a5-cc13835ba482.xml.asp?frame=true.

"Sea Tools," Seagate Technology LLC, 2005, <http://www.seagate.com/support/seatools>.

"Hard Drive Diagnostics Tools and Utilities," TACKtech Corp., Jul. 14, 2005, <http://www.tacktec.com/display.cfm?ttid=287>.

"Ata Hard Drives," Maxtor Corporation, 1996-2005, <http://www.maxtor.com/portal/site/Maxtor/menuitem.3c67e325e0a6b1f6294198b091346068/?channelpath=/en_us/Support/Software%20Downloads/ATA%20Hard%20Drives&downloadID=22>.

Hard Drives, Fijitsu, 2001-2005, http://www.fcpa.com/support/hard-drives/software_utilities.html.

* cited by examiner

DETECTION AND MITIGATION OF DISK FAILURES

BACKGROUND

Disk drives contain data that is necessary for any modern computer. Technology in disk drives has improved greatly but drives are still prone to failures which can cause catastrophic losses in data. In the past, specific tools have existed to analyze the health of disk drives, but the ability to know in advance that a disk drive is failing and providing steps to avoid catastrophic data loss has been lacking.

SUMMARY

A method and apparatus to detect and mitigate disk failure is disclosed. The method may collect data from a disk from time to time and by analyzing the data, may provide an alert that there is a bad disk. The method may be part of an operating system. The method may also provide a method to backup a bad drive and may provide instructions on how to replace the bad drive. In addition, the method may collect data on bad drives for additional analysis. A computer readable medium containing computer executable code in accordance with the method and a computer system to execute the method also are disclosed.

DRAWINGS

DESCRIPTION

Although the following text sets forth a detailed description of numerous different embodiments, it should be understood that the legal scope of the description is defined by the words of the claims set forth at the end of this patent. The detailed description is to be construed as exemplary only and does not describe every possible embodiment since describing every possible embodiment would be impractical, if not impossible. Numerous alternative embodiments could be implemented, using either current technology or technology developed after the filing date of this patent, which would still fall within the scope of the claims.

It should also be understood that, unless a term is expressly defined in this patent using the sentence "As used herein, the term '_____' is hereby defined to mean . . . " or a similar sentence, there is no intent to limit the meaning of that term, either expressly or by implication, beyond its plain or ordinary meaning, and such term should not be interpreted to be limited in scope based on any statement made in any section of this patent (other than the language of the claims). To the extent that any term recited in the claims at the end of this patent is referred to in this patent in a manner consistent with a single meaning, that is done for sake of clarity only so as to not confuse the reader, and it is not intended that such claim term by limited, by implication or otherwise, to that single meaning. Finally, unless a claim element is defined by reciting the word "means" and a function without the recital of any structure, it is not intended that the scope of any claim element be interpreted based on the application of 35 U.S.C. §112, sixth paragraph.

Figure 1:
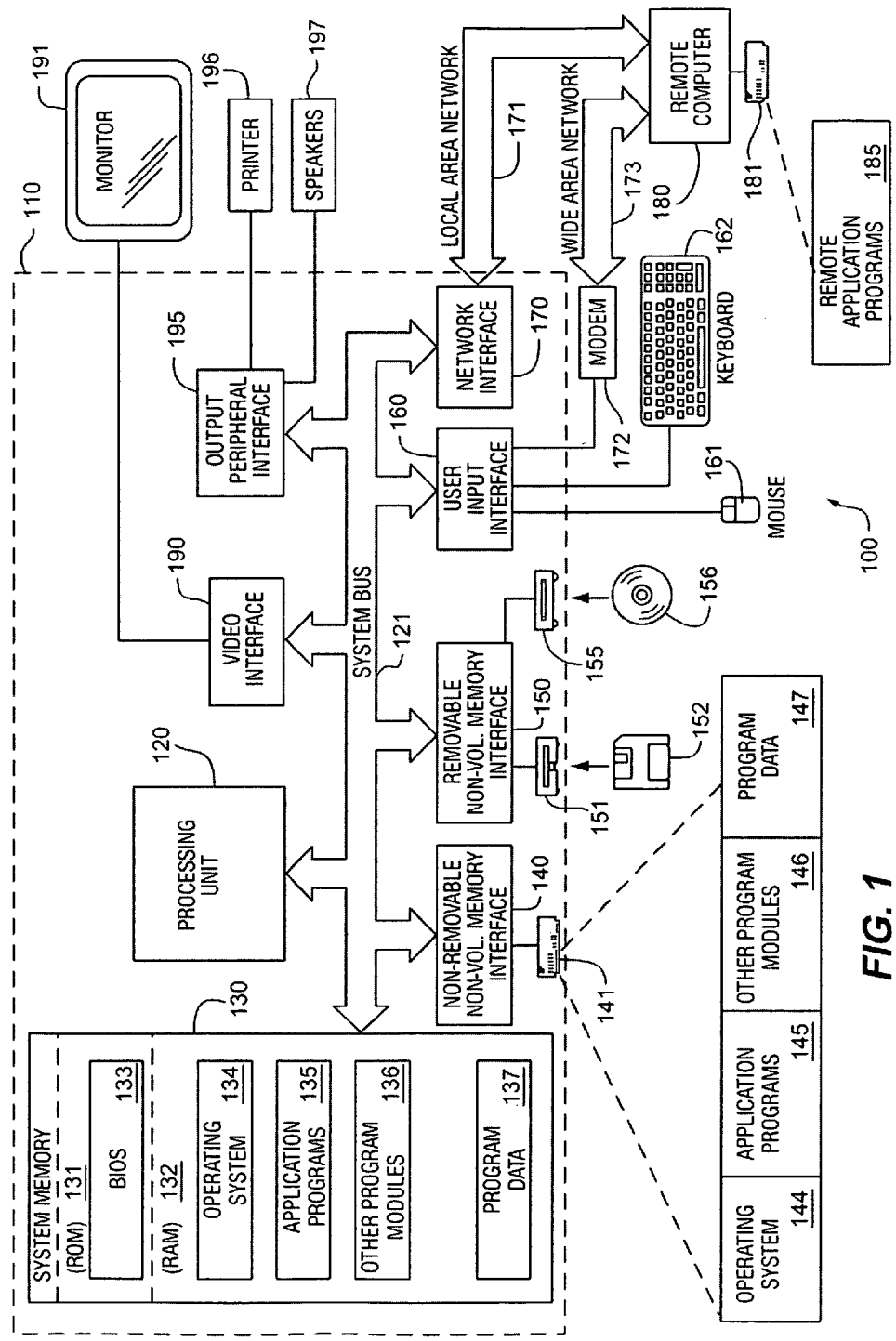
FIG. 1 is a block diagram of a computing system that may operate in accordance with the claims.

FIG. 1 illustrates an example of a suitable computing system environment 100 on which a system for the steps of the claimed method and apparatus may be implemented. The computing system environment 100 is only one example of a suitable computing environment and is not intended to suggest any limitation as to the scope of use or functionality of the method of apparatus of the claims. Neither should the computing environment 100 be interpreted as having any dependency or requirement relating to any one or combination of components illustrated in the exemplary operating environment 100.

The steps of the claimed method and apparatus are operational with numerous other general purpose or special purpose computing system environments or configurations. Examples of well known computing systems, environments, and/or configurations that may be suitable for use with the methods or apparatus of the claims include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The steps of the claimed method and apparatus may be described in the general context of computer-executable instructions, such as program modules, being executed by a computer. Generally, program modules include routines, programs, objects, components, data structures, etc. that perform particular tasks or implement particular abstract data types. The methods and apparatus may also be practiced in distributed computing environments where tasks are performed by remote processing devices that are linked through a communications network. In a distributed computing environment, program modules may be located in both local and remote computer storage media including memory storage devices.

With reference to FIG. 1, an exemplary system for implementing the steps of the claimed method and apparatus includes a general purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable, volatile/nonvolatile computer storage media. By way of example only, FIG. 1 illustrates a hard disk drive 140 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer 20 through input devices such as a keyboard 162 and pointing device 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 190.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

Disk drives 140 may have the potential to fail. There may be signs in advance that the disk drive 140 may fail. If these signs are analyzed, catastrophic data loss may be avoided by backing up the drive and replacing the drive. There may be two mechanisms for detecting that disk may be predicted to fail.

Figure 2:
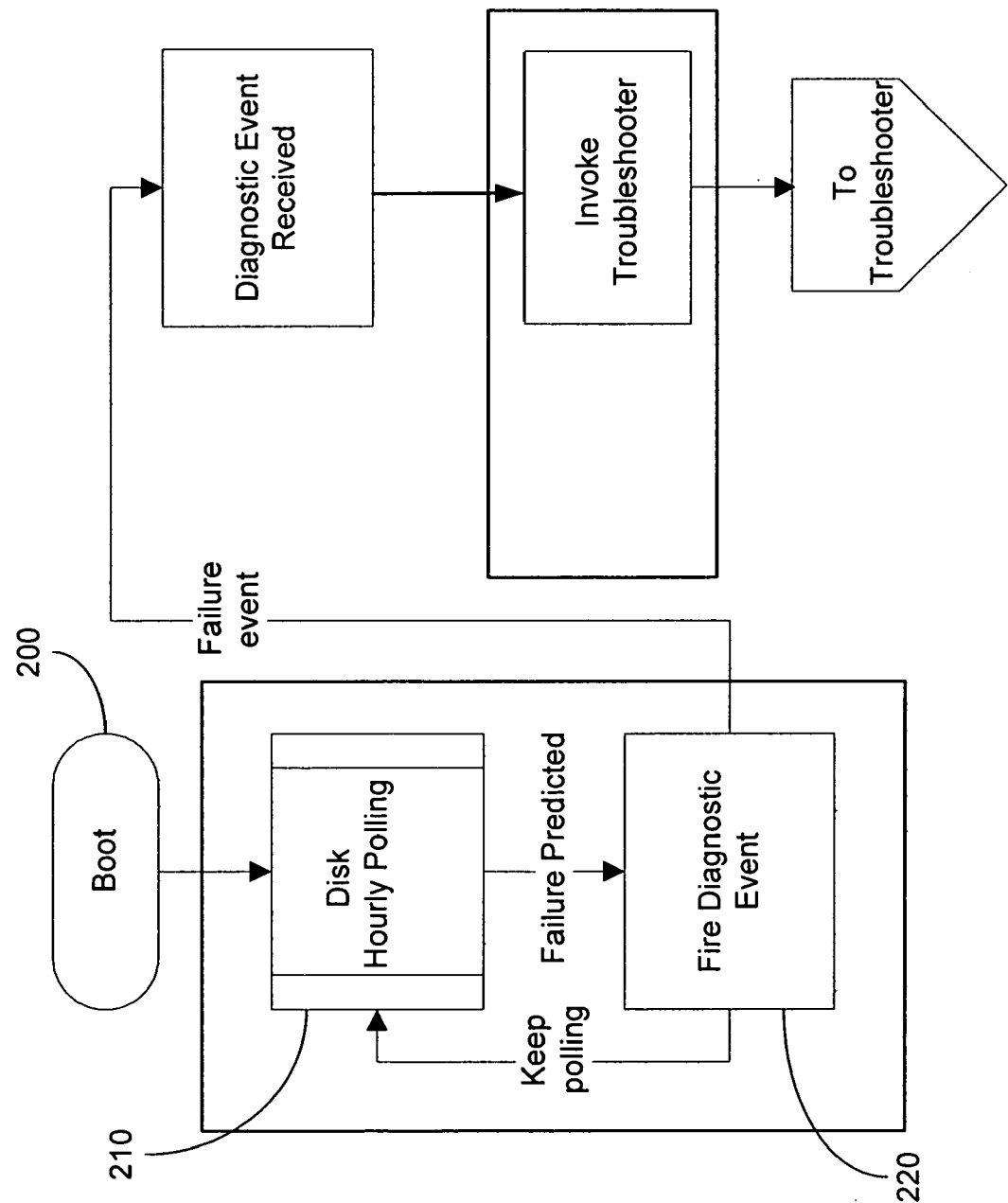
FIG. 2 is a block diagram of disk monitoring in accordance with the claims.

Referring to FIG. 2, a first scenario may involving polling a disk periodically 210 to determine if there are any problems or events to report. Polling may start at boot time 220 or shortly thereafter. This polling may apply to disks on busses that support Self-Monitoring, Analysis and Reporting Technology or SMART (e.g. ATA). If the disk is spinning, disk failure status may be polled without resetting the idle timer. If a disk is spun down, retrieval of disk failure prediction status may fail. In this case polling may continue on an hourly basis and may succeed when the disk next spins up.

In a second scenario, disk problems or events may be detected when a SCSI disk returns a sense code indicating that a failure prediction threshold has been crossed. This sense code may be returned after any input/output ("IO"), thus the scenario may not need to commence on the hourly schedule of the polling mentioned above.

When a positive failure prediction status is detected by the operating system via polling or via a SCSI sense code, a diagnostic event may be fired 220 to tell the diagnostic scenario to start 230. This event may not contain information about the specific disk that detected failure. Instead, the other diagnostic components may query the disks on the system again to identify the newly failing disk. This may make the operating system less vulnerable to spoofing attacks (i.e. the triggering of additional components may cause a performance hit, but a user will not be told to replace a healthy disk because someone lied to us about a healthy disk being bad).

Trouble Shooter

The job of the troubleshooter 240 may be to log event for consumption by an IT administrator, and/or to invoke the resolver. A system log event may be logged every time a bad disk is detected for the first time.

Figure 3:
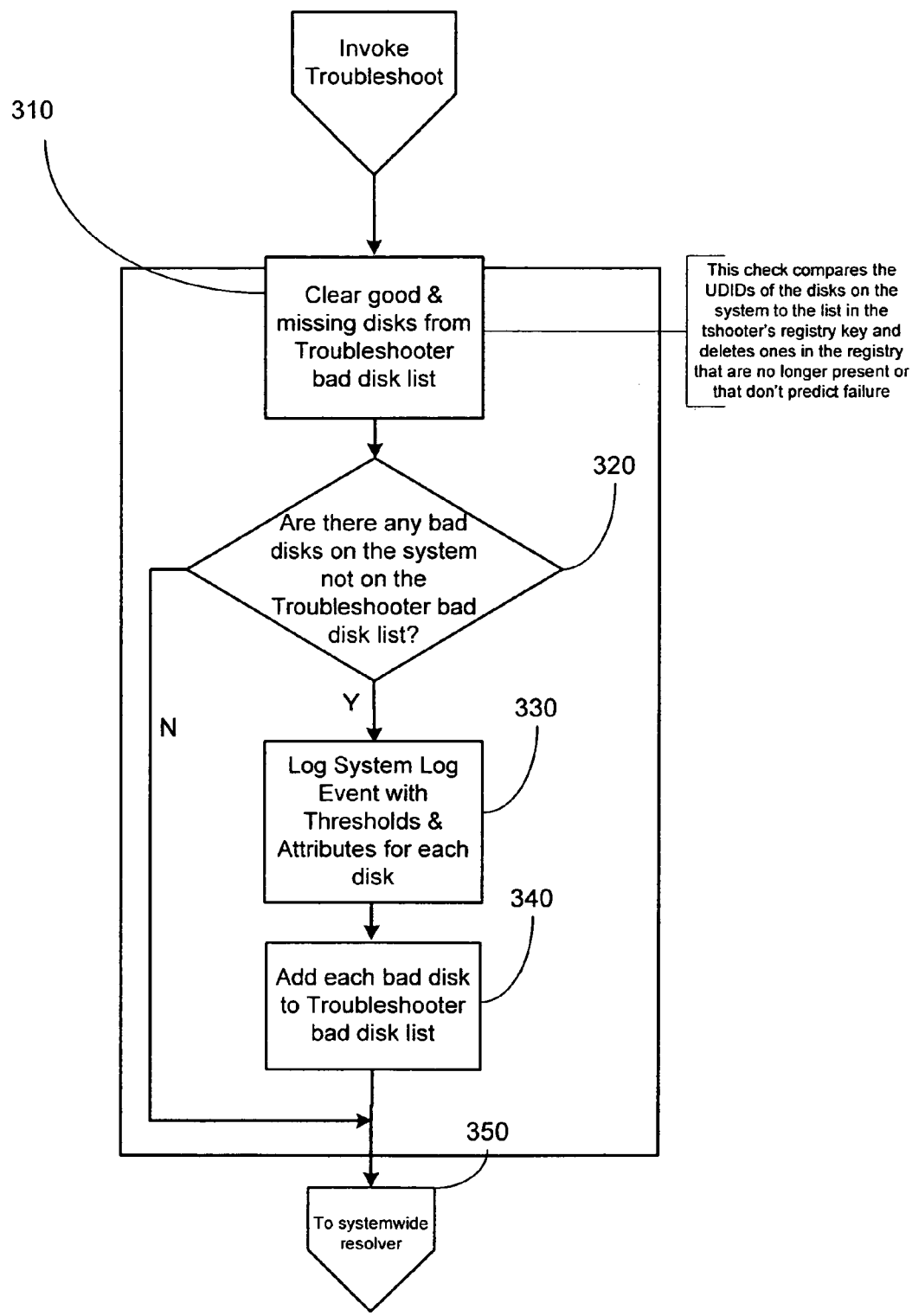
FIG. 3 is a block diagram of troubleshooting in accordance with the claims.

FIG. 3 may be a description of a troubleshooter. If the troubleshooter's bad disk list contains entries that are stale (i.e. no longer present on the system, or no longer predicting failure), then it may remove those disks from the list at block 310. At block 320, a decision may be made whether that are any bad disks on the system not on the troubleshooter bad disk list. If the decision is no, control may pass to block 350 to invoke the resolver. If the decision is yes, at block 330, for each newly-discovered bad disk, it may log a failure event at block 330, and store the unique identifiers corresponding to the disk in its registry-based bad disk list at block 340 before invoking the resolver 350. At block 330, the troubleshooter may attempt to retrieve the SMART attribute & threshold data or SCSI log data from each of the newly failing disks if the disks support retrieving that data. For each disk where the data retrieval is not supported, the an event is logged to the activity log per disk that doesn't support the data collection (it may still support failure prediction). Block 330 may then log an event to the system log for each newly discovered bad disk. If the disk supports retrieving the failure prediction data and the retrieval request succeeds, then that data may be included in a binary data section of this event.

At block 340, the troubleshooter may add the unique disk identifier ("UDID") of the newly failing disks to the troubleshooter's bad disk list, along with additional data on the date & time that the failure was detected. If some unexpected interruption prevents block 340 from completing after block 330 has already completed (e.g. system crash, shutdown, troubleshooter crash, etc), the next time that the poller detects a failure, block 330 may log a duplicate event and invoke block 340 again thereby logging two events instead of none.

Block 310 and 340 may appear redundant as the system has already encountered all bad disks at block 310. The reason that the troubleshooter executes block 350 may be to ensure that bad disks are added to the list. Perhaps the system crashed as soon as block 350 started, preventing the systemwide resolver from setting up a per-session user resolver user experience to warn the user. It may be more important to try to deliver a warning to the user reliably than it is to lose system performance if there's a disk failure. Thus the method may launch the systemwide resolver unnecessarily, but in return the method may be resilient to unexpected failures.

The data that may be stored to in the bad disk list may be a UDID corresponding to the disk along with additional data on the date & time stamp of the first prediction time. Storing the date and time may enable the method to display when the disk in question first started predicting a failure. The requirements for the UDID may be as follows:

Ability to be able to distinguish between two different disks with the same manufacturer/model no in the same computer;

If a disk is in the same slot on two different boots then the disk identity data should be the same for that disk;

If a disk is moved from one slot to another the system would prefer to identify it as the same disk rather than a new disk; and If a disk is reformatted/repartitioned the UDID should be the same.

Figure 4:
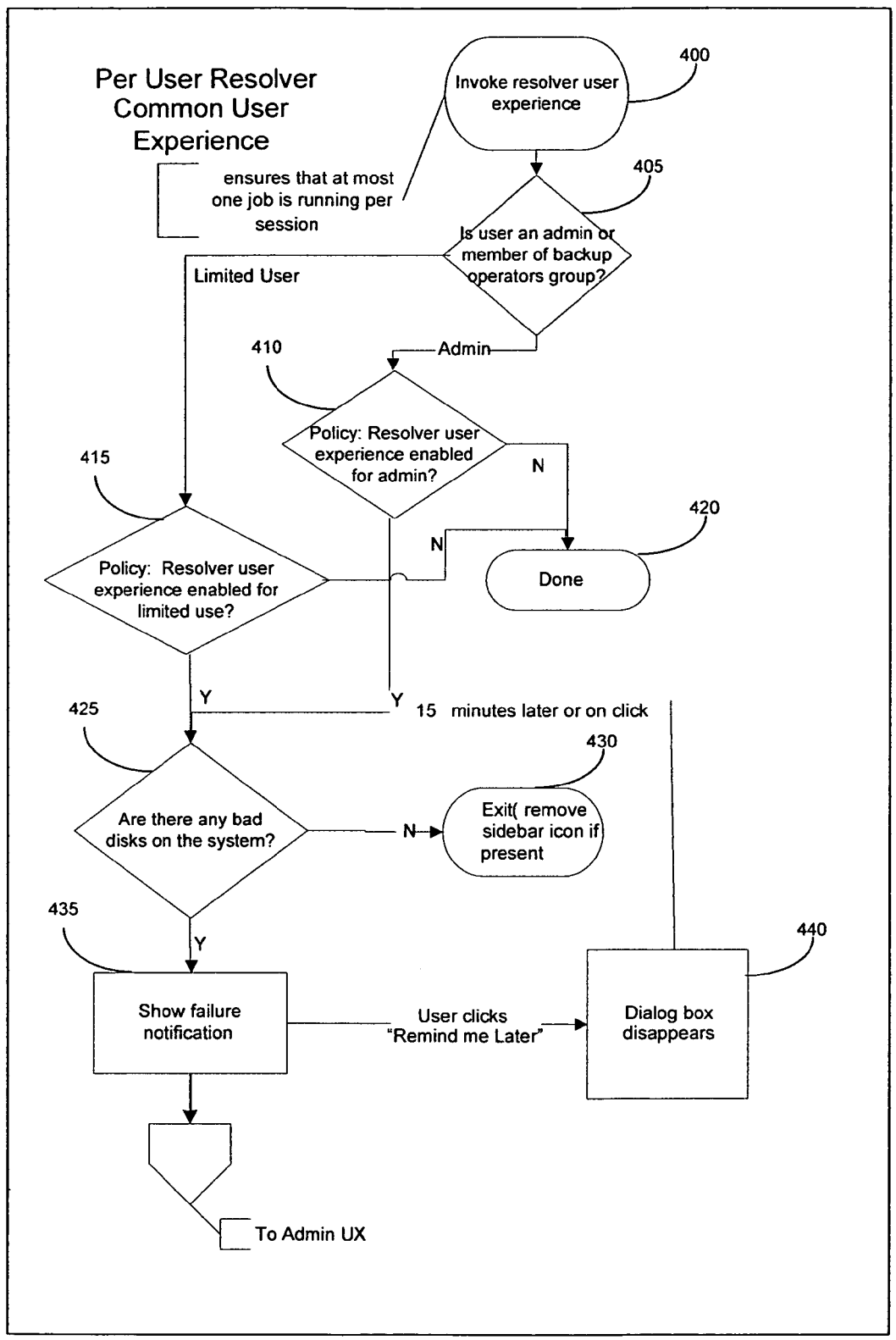
FIG. 4 is a block diagram of a implementing a resolve in accordance with the claims.

If one of the disks that was previously marked bad shows up in the system again and is still bad, the method may want to warn the user. Thus the method may want to purge the stale entries from the bad disk list so that the method will go through the entire flow if one of those disks gets added back. Referring to FIG. 4, block 410 may compare the list of disks that currently predict failure on the system to its bad disk list. If there are entries on the bad disk list that aren't present on the system, or that are present but no longer predict failure, those stale entries may be purged from the bad disk list. If a disk on the system previously got onto the bad disk list because it predicted failure, and it now no longer predicts failure, the method may want to trust the disk and remove it from the list. For example, if a disk vendor implements a "fix disk" method and a user invokes that on the disk, then the method may not want to keep telling the user to replace the disk afterwards as long as the disk says it's OK. If the disk is no longer installed on the computer, the method may not be able to identify which disk is being purged because it isn't present. The method may not store anything but the UDID, which isn't human-readable, therefore, this event is not explicit about which disk was removed. If the disk is still installed on the computer, but the method no longer predicts a failure, a different message may be stored.

The troubleshooter may need to retrieve the UDID from each failing disk. If UDID retrieval fails, then the method may have no way to reliably identify that disk. In this case the an event is logged for that disk, and the disk is ignored in the rest of the troubleshooter steps (i.e. the method may not log any more events about it).

The saved descriptions of the events may be sent to the resolver. Even if the troubleshooter finds no bad disks on the system (or it finds a disk but the disk doesn't support UDID), the method may still invoke the resolver. This case is a rare case, but the method want to make sure that it never miss a failure. The troubleshooter may launch the resolver after it has processed all of the failing disks on the system—it doesn't launch the resolver once per disk.

Problem Resolution

Problem resolution requirements may vary depending on the environment of the disk drive. In the home, the original equipment manufacturer ("OEM") may want to provide a different failure user experience than the in-box user experience, or the OEM may want to leverage the in-box user experience, but provide contact information that can be customized at system build time. In an enterprise, the IT administrator may want to replace the in-box user experience with a silent interface that opens a helpdesk ticket automatically and schedules the user's calendar for a visit by a hardware technician. The resolution phase provides several tiers of customizability to enable these scenarios. For example, the OEM or IT administrator may disable resolution, or point the method to a different executable from the built-in system resolver. The OEM or IT administrator may enable/disable the resolution user experience for limited users & administrators/backup operators separately. The OEM or IT administrator may provide support contact information that will be displayed as part of the inbox resolution experience. This may be provided on a method wide basis as part of the method settings, or on a disk-diagnostic specific basis if there is different contact information for disk failures.

At a high level, there may be two phases for resolution. The first phase may occur on a systemwide basis. This phase may attempt to take a silent backup if possible, and then it invokes the second phase. The second phase may consists of a resolver user experience that is shown on a user-by-user basis with appropriate backup/restore user experience per user. Only one instance of the systemwide resolver may be permitted to run simultaneously to ensure registry data consistency, and it also ensures that only one instance of the per-session user resolver user experience can run at a time in a given user session to avoid inundating the user with multiple warnings.

Resolver

FIG. 4 may illustrate the per user resolver common user experience. At block 400, the per-session user resolver user experience may be an executable that is invoked in the user context and session where the warning will be displayed to the user. It may perform a series of checks initially to determine whether a user interface should be displayed to the user, and which user interface should be displayed. If the user is logged on at the time that the disk failure is detected, the method may be used to invoke the job immediately. Alternatively, if the user logs on after the disk failure is detected, the resolver may be run one minute after the user has logged on. Only one instance of the resolver user experience may be running in any user's context (although multiple resolvers can run in different contexts simultaneously if multiple users are logged on). The user's instance of the resolver user experience may handle the warning for ALL of the failing disks at any given time, even if there are multiple bad disks present at once. When the job is initially launched no windows are shown.

At block 405, a decision may be made whether user is an administrator or member of the backup operators group or a limited user. In order to decide this, the method may compare its context against the well-known administrator and backup operators identifications. Based on the result of that comparison, one of two experiences is executed—one for administrators at block 410, and the other for limited users at block 415. The per-session user resolver user experience may operate with "the highest privilege available" to ensure that administrator are able to take advantage of backup, which may require administrative privileges to execute. At block 410, a decision may be made whether a user experience is enabled for an administrator. If the decision is no, the method may end at block 420. If the decision is yes, control may pass to block 425. Similarly, block 415 may make a decision whether a user experience is enabled for limited users. If the decision is no, control may pass to block 420 where the method may end. If the decision is yes, control may pass to block 425. The user interface may be disabled to ensure that only certain people can use the interface, such as disk professionals, for example.

At block 425, the method may make a decision whether there are any bad disks on the system. This job may run at a time when there are no bad disks on the system. For example, if a disk predicted failure and was removed by the administrator, and the user logged on before the logon trigger expired one month from the prediction, the user experience might run when no bad disks are present. Block 425 may check to see whether there are any bad disks on the system and exits at block 430 if there are none. If there is a bad disk, control may pass to block 435.

At block 435, a disk failure notification may be presented to the user. The user can choose "Remind me later" in which case control passes to block 440 and the user experience disappears and returns 15 minutes later, returning control to block 435. The recommended choice may be for the user to click "Print instructions and start backup" which may launch the full user experience. If the user repeatedly chooses "Remind me again in 15 minutes," then on the 5th time, the dialog box may give the option "Don't remind me again". When any admin user clicks on this, the resolver sends an expire event and the method may not run again until another disk failure occurs. The user may also choose to view details, where the method may vary the user interface depending on the privilege of the user. This check may be similar to the check in block 405 and may determine which user interface to show.

Figure 5:
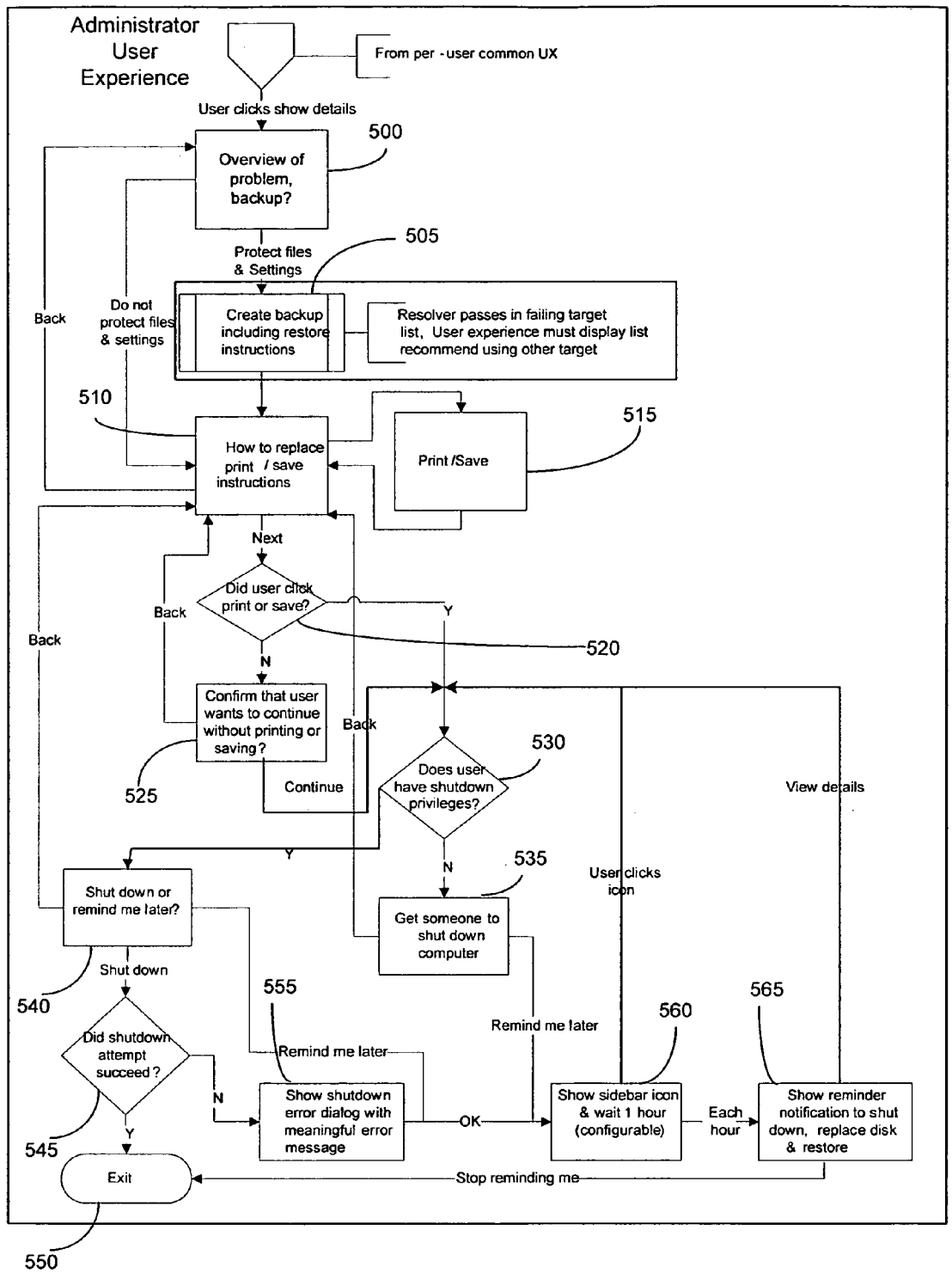
FIG. 5 is a block diagram of a per-user resolver user experience in accordance with the claims.

FIG. 5 may be an overall view of the method when a disk is predicted to fail. At block 500, a user may decide whether to back up the failing disks or not. If the user decides not to protect files and settings, control may pass to block 510. If the user decides to backup, control may pass to block 505 where a backup may be created including restore instructions and control may pass to block 510. At block 510, information may be provided on how to restore the data once the user has replaced the failing part. The information may include a support contact, a support phone number and the disks affected such as a table of disks affected, with columns for friendly name, capacity, volumes & failure type. An example may be as follows:

Disk Diagnostic Repair Instructions

Step 1: Contact your support provider: <Support Provider Name>

Phone: <Phone or entire field blank if not configured>

Web: <Support URL or entire field blank if not configured>

Step 2: Follow your support provider's instructions for repairing or replacing the following disks:

Disk Capacity Volumes Failure Type

Disk Friendly name, including serial number, capacity, volume

Step 3: Restore your data

If the user clicks "Save Instructions", a standard file-save dialog may be displayed. If the admin clicks "Print Instructions" a standard print dialog may be displayed. If the user clicks back, the method may return to block 500 even if backup was run at 505. If the user clicks Next, the method may proceed to block 520. If the user clicks print, a standard print dialog may be displayed. If the user clicks save, a standard save dialog should be displayed. If the user leaves block 520 without printing/saving, the method may ask a user to again decide whether they wish to proceed without printing or saving before continuing at block 525 as they will need these instructions to recover from the disk failure and then control may pass to block 530. If the user printed or saved, then the method may proceed to block 530. If the user clicks back, the method may return to block 510.

At block 530, the method may determine whether the user has shutdown privileges. The user may not have shutdown privileges, as these are similar to administrative privileges. If the user has shutdown privileges, then the method proceed to block 540 where the method may inform the user to shut down themselves. If not, at block 535 the method may request the user locate someone with administrative authority to shut the system down. If the user clicks back, then the method may return to block 510. Otherwise the method may go to the reminder loop at block 560 where every hour (or other useful time period) the notification may be displayed at block 565 to remind the user to shut down. If the user chooses to view details, the method may proceed to block 530. If the user chooses not to be reminded again, the method may exit at block 550.

At block 540, the method may inquire whether it should shut down or remind the user to shut down later. If the user chooses to shut down, the method may proceed to block 545 where the method may attempt to shut down. Otherwise the method may proceed to block 560 where a reminder loop may begin. If the user chooses back, the method may proceed to block 510. If the shutdown attempt succeeds, then the method may exit at block 550. If the shutdown attempt fails, the method may display an error dialog with the text translation of the Error Code (e.g. access denied) at block 555.

The method may not display any user interface once a user has replaced a bad disk to acknowledge that the problem has been solved. The first reason may be that it is hard to detect that a problem has been solved right when that happens (how exactly does the OS know that the bad disk has been replaced?), and the method does not want to pop up a user interface hours or days later confirming that the problem is solved as such a pop-up may add confusion. The second reason is that there may be another bad disk, or other problem on the computer, and telling the user that the problem is solved may be incorrect and frustrating.

The method may also log activity events so that OEM support and developers can understand what happened on systems where the disk predicted failure. The goal of submitting this data is to leverage the feedback to provide OEMs and disk manufacturers with data that they can use to improve the quality of the next generation of disks, as well as data to improve the failure-prediction mechanisms of their disks. The method may provide error reports that show not only the root cause of the failure of the disk, but also the correlation of that failure type with other failure types on the same computer. This may be valuable so that lesser failures leading up to a catastrophic failure can be used to predict catastrophic failures in the future. The appropriate data may be provided to partners via a vendor portal.

Some of the feedback that may describe the problem encountered on a production computer and the root cause for that problem may include:

Which disk make/models are failing?

On which OEM systems?

After what period/pattern of use (total bytes written/read from this disk and/or power on hours and/or hours since disk installed)?

For what reason (SMART attribute thresholds/values and SCSI log page information)?

When disk hardware predicts failure, what other disk-related failures happened on the system?

What is the mean time to failure for disks, including data on healthy disks (total bytes written/read and/or power on hours and/or hours since disk installed for all disks across ecosystem and count of total disk failures)?

When disks do not predict failure, what other disk-related failures happened on the system?

How frequently is the hardware failure warning a false positive?

How frequently is the hardware failure warning a false negative?

Although the forgoing text sets forth a detailed description of numerous different embodiments, it should be understood that the scope of the patent is defined by the words of the claims set forth at the end of this patent. The detailed description is to be construed as exemplary only and does not describe every possible embodiment because describing every possible embodiment would be impractical, if not impossible. Numerous alternative embodiments could be implemented, using either current technology or technology developed after the filing date of this patent, which would still fall within the scope of the claims.

Thus, many modifications and variations may be made in the techniques and structures described and illustrated herein without departing from the spirit and scope of the present claims. Accordingly, it should be understood that the methods and apparatus described herein are illustrative only and are not limiting upon the scope of the claims.

The invention claimed is:

1. A method of monitoring a disk device as part of an operating system comprising:
    polling the disk device periodically for events;
    analyzing the events in the result of polling the disk device;
    determining whether the events in the results of the polling indicate a disk failure is predicted;
    if the determination is false, waiting a predetermined period of time and repeating the method;
    if the determination is true, triggering a diagnostic utility and passing the events to the diagnostic utility,
    wherein the diagnostic utility comprises:
        entering in a log, for newly predicted failures, an entry about the predicted failure;
        determining, for each entry on the log, whether the entry is stale, wherein an entry is stale if (a) the disk to which the entry pertains is no longer present or (b) failure is no longer predicted for the disk to which the entry pertains;
        removing stale entries from the log; and
        forwarding the failure on to a system wide resolver.

2. The method of claim 1, wherein the system wide resolver comprises:
    scheduling a per-session user resolver user experience to warn about failure if any bad disks are present on the system.

3. The method of claim 2, wherein per-session user resolver user experience comprises:
    determining whether the bad disk is on the system;
    if the bad disk is on the system:
        walking an administrator through backup procedure;
        providing instructions for replacing the bad disk;
        providing instructions for restoring data;
        warning users not to save data to the bad disk;
    if the bad disk is not on the system, exit the method.

4. The method of claim 1, further comprising alerting an administrator about a bad disk.

5. The method of claim 1, wherein the method further comprises logging data on bad disk for further analysis.

6. A computer readable storage medium having computer executable instructions for performing steps of a method of monitoring a disk device as part of an operating system comprising:
    computer executable instructions for polling the disk device periodically for events;
    computer executable instructions for analyzing the events in the result of polling the disk device;
    computer executable instructions for determining whether the events in the results of the polling indicate a disk failure is predicted;
    if the determination is false, computer executable instructions for waiting a predetermined period of time and repeating the method;
    if the determination is true, computer executable instructions for triggering a diagnostic utility and passing the events to the diagnostic utility,
    wherein the diagnostic utility comprises:
        computer executable instructions for entering in a log, for newly predicted failures, an entry about the predicted failure;
        computer executable instructions for determining, for each entry on the log, whether the entry is stale, wherein an entry is stale if (a) the disk to which the entry pertains is no longer present or (b) failure is no longer predicted for the disk to which the entry pertains;

computer executable instructions for removing stale entries from the log; and computer executable instructions for forwarding the failure on to a system wide resolver.

7. The computer readable storage medium of claim 6, wherein the system wide resolver comprises:

computer executable instructions for scheduling a per-session user resolver user experience to warn about failure if any bad disks are present on the system.

8. The computer readable storage medium of claim 7, wherein per-session user resolver user experience comprises:

computer executable instructions for determining whether the bad disk is on the system, comprising:

if the bad disk is on the system:

computer executable instructions for walking an administrator through backup procedure;

computer executable instructions for providing instructions for replacing the bad disk;

computer executable instructions for providing instructions for restoring data;

computer executable instructions for warning users not to save data to the bad disk; and if the bad disk is not on the system, computer executable instructions for exiting the method.

9. The computer readable storage medium of claim 6, further comprising computer executable instructions for alerting an administrator about a bad disk.

10. The computer readable storage medium of claim 6, wherein the method further comprises computer executable instructions for logging data on bad disk for further analysis.

11. A computing apparatus, comprising:

a display unit that is capable of generating video images;

an input device;

a processing apparatus operatively coupled to said display unit and said input device, said processing apparatus comprising a processor and a memory operatively coupled to said processor, a disk drive connected to the processor;

a network interface connected to a network and to the processing apparatus;

said processing apparatus being programmed to execute a method of monitoring a disk device as part of an operating system comprising:

polling the disk device periodically for events;

analyzing the events in the result of polling the disk device;

determining whether the events in the results of the polling indicate a disk failure is predicted;

if the determination is false, waiting a predetermined period of time and repeating the method;

if the determination is true, triggering a diagnostic utility and passing the events to the diagnostic utility, wherein the diagnostic utility comprises:

entering in a log, for newly predicted failures, an entry about the predicted failure;

determining, for each entry on the log, whether the entry is stale, wherein an entry is stale if (a) the disk to which the entry pertains is no longer present or (b) failure is no longer predicted for the disk to which the entry pertains;

removing stale entries from the log; and forwarding the failure on to a system wide resolver.

12. The computing apparatus of claim 11, wherein the system wide resolver comprises scheduling a per-session user resolver user experience to warn about failure if any bad disks are present on the system.

13. The computing apparatus of claim 12, wherein per-session user resolver user experience comprises:

determining whether the bad disk is on the system;

if the bad disk is on the system:

walking an administrator through backup procedure;

providing instructions for replacing the bad disk;

providing instructions for restoring data;

warning users not to save data to the bad disk;

if the bad disk is not on the system, exit the method.

14. The computing apparatus of claim 11, further comprising alerting an administrator about a bad disk.

15. The computing apparatus of claim 11, wherein the method further comprises logging data on bad disk for further analysis.

* * * * *